Sept. 5, 1944. J. A. BALDWIN 2,357,572

FILTER

Filed July 18, 1940

Inventor
Jesse A. Baldwin

Attorneys

Patented Sept. 5, 1944

2,357,572

UNITED STATES PATENT OFFICE 2,357,572

FILTER

Jesse A. Baldwin, Spooner, Wis.

Application July 18, 1940, Serial No. 346,229

19 Claims. (Cl. 210—183)

This invention relates to improvements in filters, and, in its more specific aspects, to an oil filter adapted to be connected into the pressure lubricating system of an automotive engine.

Among the objects of the invention may be noted the provision of an improved oil filter characterized by simplicity of design, which may be manufactured at relatively low cost, which is rugged and durable in use, and which effectively cleans oil passing therethrough; the provision of an oil filter which is so constructed and organized that the incoming oil has no appreciable action in churning or otherwise disturbing the heavy dirt particles already separated out and collected in the filter casing or adhering to the filter unit therein; the provision of a filter capable of separating from the oil any condensed water entrained therein; the provision of a filter employing a novel head construction through which the oil is passed to and discharged from the filter element; the provision of a filter head providing a novel seat for the upper edge of the filter casing and which is so organized and related to the casing that it may be readily attached to and removed from the casing, thus to permit ready removal of a dirty filter element and the substitution of a new element as required; the provision of an improved filter element in which the constituent parts are so organized and related as to preclude channeling of the oil as characteristic of prior filters employing cotton waste as the filtering medium; the provision of an improved filter element in which the filtering medium is contained within a shell of novel construction and material, and which effects a preliminary separation and collection of the heavy sludge and dirt particles passing to the main filtering medium contained therein.

Other objects will be in part obvious and in part hereinafter pointed out in connection with the following analysis of this invention wherein is illustrated an embodiment of the invention in detail.

Referring to the drawing.

Figure 1:
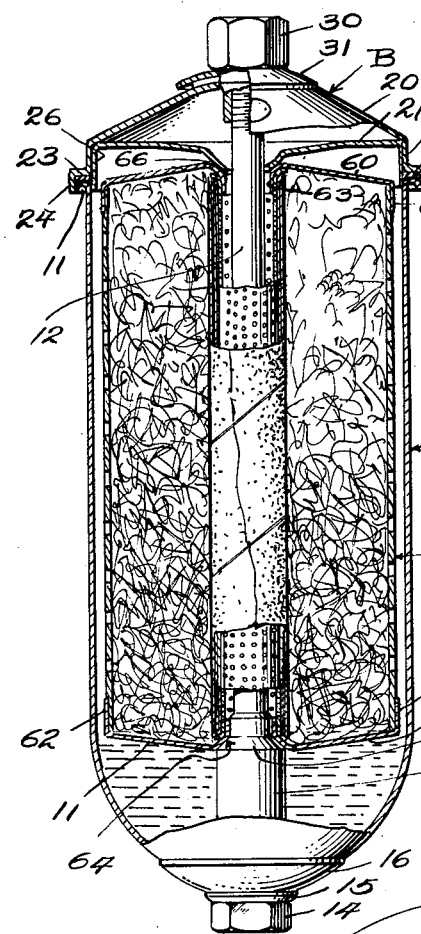
Fig. 1 is a vertical section taken through a filter in accordance with the present invention.
Figure 2:
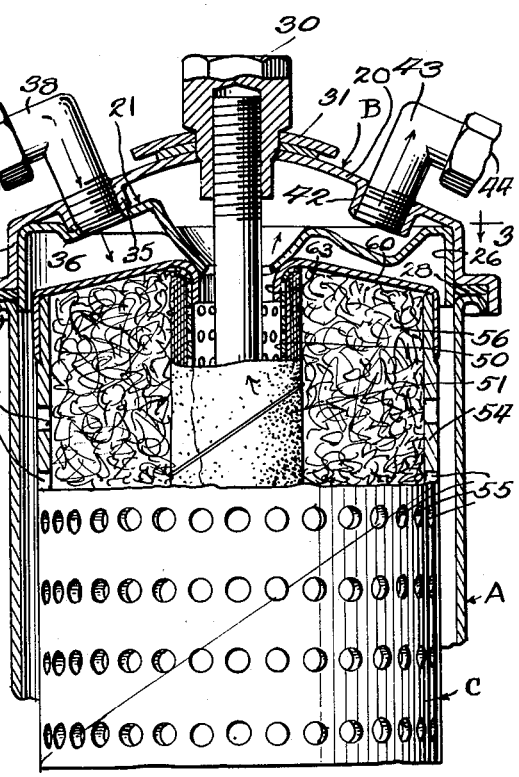
Fig. 2 is a broken-away section through the upper portion of the filter shown in Fig. 1, with the filter turned 90° from its Fig. 1 position.
Figure 3:
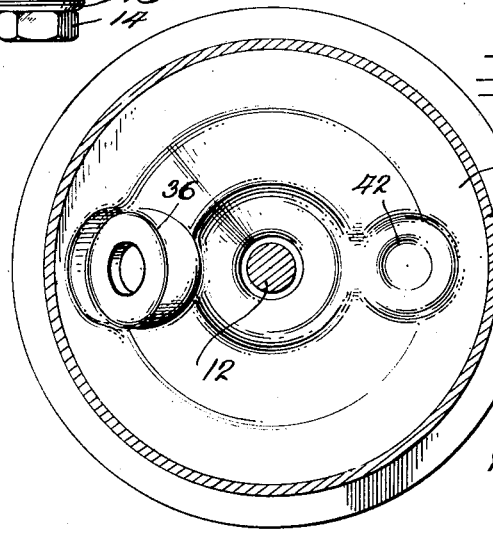
Fig. 3 is a section through the filter head taken generally along lines 3—3 of Fig. 2.

In the drawing, wherein like reference characters designate like parts throughout the several views, the filter of the present invention is shown as comprising an open-top casing A, a head generally designated B, and a filter element C. The filter casing is substantially cylindrical, having a bowl-shaped bottom, and an open top defined by an outwardly flanged or curled edge 11.

Fixed to the casing is a mounting rod 12, the lower end of which extends through the bottom of the casing, being permanently secured thereto by a nut 14 disposed exteriorly of the casing and spaced from the casing proper by a lock washer 15 and a strengthening dish-shaped washer 16. Adjacent its lower end the rod 12 is formed with a large diameter portion 17 terminating in a tapered shoulder 18 forming a seat for the filter element to be described. The rod 12 extends axially of the casing A and is of a length to project well above the open top thereof, its upper end being threaded to receive a head securing nut.

The casing head B is constituted by two sheet metal stampings 20, 21 of circular contour, of which the upper stamping 20 is dome-shaped and is provided with a central opening through which passes the mounting rod 12. The dome-shaped portion thereof is defined by a cylindrical flange portion 22, from which extends radially a horizontal flange 23 and a peripheral flange 24 which extends axially.

The under stamping 21 has a main or central portion which is upwardly concave, being provided with a central aperture through which rod 12 may pass, and with a peripheral flange 26 of lesser diameter than the axial flange 24 of the upper stamping, and which extends axially and terminates at about the same level as the outer flange 24.

The under head stamping 21 is adapted to nest within the upper stamping, and the said stampings are preferably press-fitted together along the meeting line of the flanges 22, 26 thereof. However the lower ends of said flanges are spaced the distance of the horizontal flange 23 of the upper stamping, thus to provide an annular holding recess for a gasket 28 against which the curled-over edge 11 of the casing A is adapted to seat.

The head constructed as aforesaid is secured to the casing A, after threading of the head over the mounting rod 12, by a head nut 30 threaded on the upper end of the rod 12, the nut carrying a dish-shaped washer 31 bearing against the upper stamping 20 of the head. It will be understood that the dome-shape of the upper stamping resists any tendency of the head to collapse upon tightening of the nut 30.

The head is provided with an oil inlet opening through which oil from the line passes into the casing A, and with an outlet opening through which oil following its cleaning is discharged from the casing. The inlet opening is preferably formed as a tubular thimble 35 drawn inwardly from the metal of the upper stamping to bear against an apertured bulge 36 formed in the under casing as by a drawing operation. Upon press-fitting of the parts, the lower edge of the thimble 35 bears directly on the upper face of the bulge 36 of the under stamping, and both the thimble and the bulge aperture are interiorly threaded for the reception of a nipple 38 connected in the oil line as by a length of flexible tubing 40. Thus oil from the line 40 may pass through the head inlet opening into the filter casing A.

By reason of the dome-shape of the upper stamping and the upwardly concave shape of the under stamping of the head parts, there is provided a substantial space between said stampings. Into this space projects a tubular thimble 42 formed as by a drawing operation on the upper stamping 20, said thimble being interiorly threaded to receive an outlet nipple 43 connected into the oil line as by a length of flexible tubing 44. The diameter of the central rod opening of the under stamping is somewhat greater than the diameter of rod 12, whereby oil leaving the filter element to be described may pass into the space between the upper and under stampings of the head, from which it returns to the oil line through the outlet thimble 42 and nipple 43.

Considering now the filter element C, such is preferably constituted by an inner tubular screen member 50 of relatively small diameter carrying a plurality of wrappings of fine filtering material 51. One such material which has been found to be highly effective is Canton flannel, arranged with its nap side facing outwardly. The wrappings of the Canton flannel may be held on the tubular screen 50 by tie cords or equivalent securing devices.

Arranged about the wrapped inner screen 50 is a relatively large diameter shell 54 which for cheapness in construction is preferably constructed from relatively heavy paper, cardboard or the like fibrous materials. The shell is self and form-sustaining, and may be formed by a length of the fibrous material wound in spiral fashion into the shell formation described. The shell 54 is provided with a multiplicity of perforations 55 which are preferably punched in the shell following its formation, thus to preserve the full diameter of the perforations throughout their depth.

Disposed between the outer shell 54 and the wrapping on the inner screen 50 is a mass of coarse filtering material 56, preferably in the form of cotton waste or equivalent fibrous material.

Upper and lower end caps 60—61, are provided to secure the filter element parts together as a unit, each of said caps being provided with a peripheral flange 62 which is rolled or otherwise pressed into the material of the outer shell 54 to have clinching engagement therewith, thereby to secure the shell between the caps. Each of the inner caps is provided with an axial bushing extension 63 adapted to fit into the tubular inner screen 50, whereby the end caps secure the tubular inner screen therebetween and concentrically with reference to the outer shell. The lower cap 61 is tapered as at 64 about its bushing extension to engage against and seat on the tapered shoulder 18 of the mounting rod 12. By this arrangement the filter may be inserted into the casing A with assurance that it is properly located vertically within the casing.

The upper cap 60 is also provided with a taper 66 about its bushing extension, with the inner edge of the under stamping of the head bearing on said cap taper whereby, upon securing of the head to the casing, the filter unit is compressed vertically and hence positioned and secured within the enclosure formed by the casing and its head.

It will be noted that the upper cap 60 of the filter element, is arranged at a level appreciably below the oil inlet opening as described whereby an oil chamber is provided in the space between the under head stamping and the upper cap 60 of the filter element. It will be further noted that the diameter of the upper cap is substantial and only slightly less than the inner diameter of the under stamping flange 26. By this arrangement there is provided a restricted passage through which the incoming oil may pass into the casing proper, this restriction serving to prevent the entering oil from churning or agitating heavy sludge or dirt particles already separated out in the casing or adhering to the outer shell 54 of the filter element as well as any condensed water that has been separated out in the filter casing, under substantial pressure.

In operation, the incoming oil is distributed over the upper cap 60 of the filter element and passes into the casing proper through the annular restriction formed between the peripheral edge of the upper cap and the head flange 26. The oil thence flows axially inwardly through the shell apertures 55 into the filter element C, being cleaned in its passage through the latter, and has axial flow outwardly of the filter element into the space between the head stampings, from whence it passes outwardly through the outlet thimble 42 and nipple 43 to the oil line 44. In passing through the filter element the oil is thoroughly cleaned, its heavier sludge and dirt particles separating out in the casing A, with the perforated paper shell functioning to effect a preliminary cleaning action. As the oil passes through the coarse cotton waste contained within the shell, it is further cleaned and it receives a final cleaning action in passing through the wrapping 51 of the inner screen.

It is here to be noted that the wrapping 51 functions in improved and highly efficient manner to prevent channeling of the oil as might otherwise occur if the filtering material consisted only of a mass of cotton waste. Assuming channeling to have been set up in the present device, the fine wrapping 51 quickly clogs at the point where the oil is channeling through the material of the element. Accordingly, the effect of the wrapping 51 is to insure equal distribution of oil flow through the filter element as a whole rather than through a small zone or channel thereof, and hence effective cleaning of the oil results.

It will be further understood that a filter as aforesaid may be readily cleaned and renewed by the simple operation of unscrewing the head nut 30 and raising the head from the casing. Upon disconnection of the casing from its mount on the engine or related vehicle part, the casing may be inverted, whereupon the dirty filter element may be slid out of the open end thereof and a new filter element thereupon inserted into the casing. Upon substitution of a new filter element as aforesaid the casing and contained filter element may be again secured to its mount, and the head placed on the casing and thereupon secured by tightening nut 30 on rod 12, whereupon the filter may again be put into service.

As many changes could be made in carrying out the above constructions without departing from the scope of the invention, it is intended that all matter contained in the above description or shown in the accompanying drawing shall be interpreted as illustrative and not in a limiting sense.

I claim:

1. In an oil filter, an open top casing, a two-part head having an oil inlet to said casing opening therethrough and an oil outlet, the head parts being shaped to provide a head chamber communicating with the interior of the casing and delivering to said oil outlet and concentric, axially extending flanges cooperating to form an annular recess which opens downwardly, and into which the top edge of the casing is adapted to extend, an annular gasket seated in said recess adapted to seal the joint between the top edge of the casing and the head, a filter element arranged in said casing in the path of oil flow between said inlet and outlet, and readily separable means securing the casing, head and filter element in assembled relation.

2. In an oil filter, an open top casing, upper and under stampings operatively related to provide a casing head having an inlet to said casing opening therethrough and an outlet, the stampings cooperating to provide a head chamber communicating with the interior of the casing and delivering to said outlet, said stampings each having a peripheral flange which extends axially and said flanges being radially spaced to provide an annular recess which opens downwardly to receive the top edge of the casing, a filter element arranged in said casing in the path of oil flow between said inlet and outlet, and readily separable means securing the casing, head and filter element in assembled relation.

3. In an oil filter, an open top casing whose top is defined by a curled over edge, upper and under stampings operatively related to provide a casing head having an inlet to said casing opening therethrough and an outlet, the stampings cooperating to provide a head chamber communicating with the interior of the casing and delivering to the outlet, said stampings each having a peripheral flange which extends axially, and said flanges being radially spaced to provide an annular recess which opens downwardly to receive the curled top edge of the casing and an interposed sealing gasket, a filter element arranged in said casing in the path of oil flow between said inlet and outlet, and readily separable means securing the casing, head and filter element in assembled relation.

4. In an oil filter, an open top casing, upper and under stampings press-fitted together adjacent their outer peripheries to provide a casing head having an inlet to said casing opening therethrough and an outlet, the stampings cooperating to provide a head chamber communicating with the interior of the casing and delivering to the outlet, said stampings each having a peripheral flange which extends axially and said flanges being spaced radially to provide an annular recess which opens downwardly to receive the top edge of the casing, a filter element arranged in the casing in the path of oil flow between said inlet and outlet, and readily separable means securing the casing, head and filter element in assembled relation.

5. In an oil filter, an open top casing, a head therefor having inner and outer flanges which extend axially to provide an annular gasket recess which opens downwardly to receive the upper edge of the casing, the head having an inlet and an outlet opening, a filter element arranged in the casing in the path of oil flow between the inlet and outlet openings, said element including upper and lower caps, said inner flange extending into the casing, said upper cap being disposed beneath the head inlet opening and having a diameter as to provide with the inner head flange a restricted annular oil passage to the casing proper, and readily separable means securing the casing, head and filter element in assembled relation.

6. In a filter element, an open top casing, a head therefor provided with an inlet and an outlet opening, a filter element arranged in the casing in the path of oil flow between said inlet and outlet openings, the casing head having a part extending into said casing and cooperating with the filter unit to provide a restricted annular passage through which oil must pass to the casing proper, thereby to prevent entering oil from agitating the dirt particles already separated out in the casing, and readily separable means for securing the casing, head and filter element in assembled relation.

7. In an oil filter, an open top casing, a head therefor constituted by upper and under sheet metal stampings secured together adjacent their peripheries and spaced from each other along their central portions to provide a head chamber, said stampings being each provided with an axial flange and said flanges being radially spaced to provide an annular recess which opens downwardly to receive the top edge of the casing, means providing an oil inlet passage through the head to said casing, means including said head chamber providing an oil outlet passage from said casing, a filter element arranged in the casing in the path of oil flow between said inlet and outlet openings, and readily separable means securing the casing head and element in assembled relation.

8. In an oil filter, an open top casing, a head therefor constituted by upper and under sheet metal stampings having telescoping engagement adjacent their peripheral portions and spaced from each other along their central portions to provide a head chamber, said under stamping being provided with a central opening, a tubular and inwardly extending thimble integral with said upper stamping and bearing on said under stamping about an opening provided therein, thereby to provide an inlet passage through the head stampings to the casing, a second tubular thimble integral with said upper stamping and extending into the head chamber and terminating short of said under stamping, thereby to provide with the central opening of the under stamping an oil outlet passage from said casing, a filter element arranged in said casing in the path of oil flow between said inlet and outlet passages, and readily separable means securing the casing, head and filter element in assembled relation.

9. In an oil filter, the combination of an open top casing, a head therefor provided with an inlet and an outlet opening, a filter element disposed in said casing in the path of oil flow between said inlet and outlet openings, the filter element comprising an inner tubular screen, a fabric wrapping thereon, a tubular outer shell of relatively stiff and form-sustaining fibrous material provided with a multiplicity of apertures therethrough, a mass of loose fibrous material filling the annular space between the inner screen and the outer shell, and top and bottom caps along their peripheries having clinching engagement with the upper and lower edges respectively of the outer shell and depending central portions adapted to locate the inner screen centrally within the outer shell, whereby to unitarily secure the filter parts together, and readily separable means securing the casing, head and filter element as aforesaid in assembled relation.

10. In an oil filter, the combination of an open top casing, a head therefor provided with an inlet and an outlet opening, a filter element disposed in said casing in the path of oil flow between said inlet and outlet openings, the filter element comprising an inner metallic screen of tubular formation, a wrapping thereon of Canton flannel having its nap surface outward, an outer stiff paper shell of the order of cardboard provided with a multiplicity of apertures therethrough, a mass of cotton waste contained in the annular space between the inner screen and the outer shell, and top and bottom caps along their peripheries having clinching engagement with the upper and lower edges respectively of the outer shell and depending central portions adapted to locate the inner screen centrally within the outer shell, whereby to unitarily secure the filter element parts together, and readily separable means securing the casing, head and filter element in assembled relation.

11. In an oil filter, the combination of an open top casing, a head therefor provided with an inlet and an outlet opening, a filter element disposed in said casing in the path of oil flow between said inlet and outlet openings, the filter element comprising an inner metallic screen of tubular formation, a wrapping thereon of Canton flannel having its nap surface outward, an outer stiff paper shell provided with a multiplicity of apertures therethrough, a mass of cotton waste contained in the annular space between the inner screen and the outer shell, and top and bottom caps each provided with axially extending flanges rolled into the upper and lower edges of the outer shell, thereby unitarily to secure the filter element parts together, and readily separable means securing the casing, head and filter element in assembled relation.

12. A head for an open top filter casing comprising upper and under stampings press-fitted together adjacent their peripheries, said under stamping nesting within the upper stamping, and the stampings being each provided with a peripheral and axially extending flange, said flanges being spaced radially to provide an annular recess for a gasket against which the casing top is adapted to seat.

13. A head for an open top filter casing comprising upper and under stampings press-fitted together adjacent their peripheries, said under stamping nesting within the upper stamping, and the stampings being spaced from each other along their central portions and being each provided with a central opening and with openings laterally thereof providing oil inlet and outlet passages through the head, said stampings being each further provided with a peripheral and axially extending flange, and said flanges being spaced radially to provide an annular recess for a gasket against which the top edge of the casing is adapted to seat.

14. A head for an open top filter casing comprising upper and under stampings press-fitted together adjacent their peripheries and spaced from each other along their central portions, said under stamping nesting within the upper stamping, said stampings being each provided with a central opening, a tubular and inwardly extending thimble integral with said upper stamping and bearing on said under stamping about an opening provided therein, and a second tubular thimble integral with said upper stamping and extending into the space between said stampings and terminating short of said under stamping.

15. An oil filter element comprising an inner tubular screen, a wrapping of fabric material thereon, a tubular outer shell of relatively stiff and form-sustaining fibrous material provided with a multiplicity of apertures therethrough, a mass of loose, fibrous material filling the annular space between the inner screen and the outer shell, and top and bottom caps along their peripheries having clinching engagement with the upper and lower edges respectively of the outer shell and being provided with central depending portions operative to locate the inner screen centrally within the outer shell, whereby the filter element parts are secured together as a unit.

16. An oil filter element comprising a metallic inner screen of tubular formation, a wrapping thereon of Canton flannel having its nap surface outward, a tubular outer shell of stiff paper of the order of cardboard provided with a multiplicity of apertures therethrough, a mass of cotton waste filling the annular space between the inner screen and the outer shell, and top and bottom caps along their peripheries having clinching engagement with the upper and lower edges respectively of the outer shell and being provided with central depending portions operative to locate the inner screen centrally within the outer shell, whereby the filter element parts are secured together as a unit.

17. An oil filter element comprising a metallic inner screen of tubular formation, a wrapping thereon of Canton flannel having its nap surface outward, a tubular outer shell of stiff paper of the order of cardboard provided with a multiplicity of apertures therethrough, a mass of cotton waste filling the annular space between the inner screen and the outer shell, and top and bottom caps each provided with a central bushing extension serving to locate and secure the inner screen and with peripheral and axially extending flanges which are rolled into the upper and lower edges of the outer paper shell.

18. An oil filter element comprising a tubular inner screen, a tubular outer shell of relatively stiff and form-sustaining fibrous material provided with a multiplicity of apertures therethrough, a mass of loose fibrous material filling the annular space between the inner screen and the outer shell, and top and bottom metallic caps having inner depending portions operative to locate the inner screen centrally within the outer shell and along their outer peripheries being clinched into the fibrous material of the outer shell along the upper and lower ends thereof, to thereby secure the filter element parts together as a unit.

19. An oil filter element comprising a metallic inner screen of tubular formation, a tubular outer shell of stiff fibrous material of the order of cardboard provided with a multiplicity of apertures therethrough, a mass of loose fibrous material filling the annular space between the inner screen and the outer shell, and metallic top and bottom caps each provided with an inner bushing extension serving to locate the inner screen centrally within the outer shell, and with a peripheral, axially extending flange, said cap flanges being pressed into the material of the outer shell along its upper and lower ends to thereby secure the filter element parts together as a unit.

JESSE A. BALDWIN.